US012700051B2

(12) United States Patent
Hwang et al.

(10) Patent No.: US 12,700,051 B2
(45) Date of Patent: Aug. 4, 2026

(54) MACHINE LEARNING SOLUTIONS FOR ENFORCEMENT OF SENSOR-DETECTED VEHICLE FACILITY INFRACTIONS

(71) Applicant: Metropolis IP Holdings, LLC, Santa Monica, CA (US)

(72) Inventors: Ji Sung Hwang, Santa Monica, CA (US); Anil Kumar Nayak, Los Angeles, CA (US); Barry James O'Brien, Seattle, WA (US); Kaleb-John Seijin Loo, Honolulu, HI (US); Owen Grace Wise Sanford, Nashville, TN (US); Alexander David Israel, Los Angeles, CA (US)

(73) Assignee: Metropolis IP Holdings, LLC, Santa Monica, CA (US)

( * ) Notice: Subject to any disclaimer, the term of this patent is extended or adjusted under 35 U.S.C. 154(b) by 171 days.

(21) Appl. No.: 18/206,431

(22) Filed: Jun. 6, 2023

(65) Prior Publication Data

US 2024/0412314 A1 Dec. 12, 2024

(51) Int. Cl.
*G06Q 50/26* (2024.01)

(52) U.S. Cl.
CPC .................................... *G06Q 50/26* (2013.01)

(58) Field of Classification Search
CPC ...................................................... G06Q 50/26
See application file for complete search history.

(56) References Cited

U.S. PATENT DOCUMENTS

| | | | | |
|---|---|---|---|---|
| 9,858,816 B2 * | 1/2018 | Cook | ..................... | G06V 20/13 |
| 10,176,405 B1 * | 1/2019 | Zhou | ...................... | H04N 7/181 |

(Continued)

FOREIGN PATENT DOCUMENTS

| | | | | |
|---|---|---|---|---|
| EP | 3683781 A1 * | 7/2020 | ............. | G08G 1/143 |
| KR | 101691312 B1 * | 12/2016 | | |
| TW | M477648 U * | 5/2014 | ............. | G06F 16/93 |

OTHER PUBLICATIONS

Martínez et al., Localization and Tracking Using Camera-Based Wireless Sensor Networks. Robotics, Vision and Control Research Group, University of Seville Spain, Jun. 24, 2011. Feb. 3, 2026 <https://cdn.intechopen.com/pdfs/15911/intech-localization_and_tracking_using_camera_based_wireless_sensor_networks.pdf> (Year: 2011).*

(Continued)

*Primary Examiner* — Sarah M Monfeldt
*Assistant Examiner* — Shaun D Sensenig
(74) *Attorney, Agent, or Firm* — Fenwick & West LLP

(57) ABSTRACT

A device detects, using input from one or more sensors installed at a parking facility of a plurality of parking facilities, an infraction caused by a vehicle. Responsive to detecting the infraction, the device generates a vehicle fingerprint by inputting a depiction of the vehicle into a supervised machine learning model, the depiction derived from one or more images of the vehicle captured at the parking facility, and receiving a feature vector of the vehicle as output from the supervised machine learning model, the feature vector comprising a plurality of embeddings each describing a dimension of the vehicle. The device monitors for entry of the vehicle at each of the plurality of parking facilities using the vehicle fingerprint, and, responsive to detecting entry of the vehicle at a given one of the plurality of parking facilities, triggers a remediation action.

20 Claims, 9 Drawing Sheets

(56) References Cited

U.S. PATENT DOCUMENTS

| | | | | |
|---|---|---|---|---|
| 2014/0376769 | A1* | 12/2014 | Bulan | G06V 20/52 382/103 |
| 2015/0170445 | A1 | 6/2015 | Bajekal | |
| 2018/0268238 | A1* | 9/2018 | Khan | G06V 10/751 |
| 2023/0069020 | A1* | 3/2023 | Leginusz | G07B 15/02 |
| 2023/0125264 | A1* | 4/2023 | Parameswaran | G06V 20/52 382/103 |
| 2023/0153698 | A1 | 5/2023 | Popov et al. | |
| 2024/0185569 | A1 | 6/2024 | Thomas et al. | |

OTHER PUBLICATIONS

Deng, J. et al., "ArcFace: Additive Angular Margin Loss for Deep Face Recognition." Journal of Latex Class Files, vol. 14, No. 8, Aug. 2015, pp. 1-17.

PCT International Search Report and Written Opinion, PCT Application No. PCT/US24/31056, Aug. 30, 2024, 17 pages.

* cited by examiner

MACHINE LEARNING SOLUTIONS FOR ENFORCEMENT OF SENSOR-DETECTED VEHICLE FACILITY INFRACTIONS

TECHNICAL FIELD

The disclosure generally relates to the field of machine learning, and more particularly relates to machine learning approaches for vehicle identification and enforcement.

BACKGROUND

Parking facilities employ gates to manage the use of their space, sometimes requiring vehicles to pass through a gate upon one or more of entry and exit. As parking facilities transition to more automated systems, implementing seamless vehicle entry and exit, they may require less or no intervention from human operators and users of vehicles. While this transition may improve efficiency, it may introduce challenges in identifying the vehicles that enter or exit the space. For example, physical space limitations in a parking facility may only allow for cameras facing the front of vehicles and environmental factors, such as glare, low-light, or weather conditions like snow and mud, may further obscure vehicles and their identifying information. Additionally, automated parking management may introduce consequences of emboldening bad actors to break rules within the parking facility with fewer human eyes present. It is impractical, from an implementation and computational efficiency perspective, to outfit parking facilities with myriad cameras and computer vision to detect bad actions, given that continuous monitoring for such a wide array of potential activities would require enormous amounts of computing power.

SUMMARY

Systems and methods are disclosed herein that improve vehicle identification in parking facilities, specifically improving on matching vehicle entry to vehicle exit, by using machine learning approaches. Entry or exit events may be generated responsive to the entry or exit of vehicles from a parking facility. Machine learning approaches may be applied to generate feature vectors describing the vehicles involved in such events. On an exit of a vehicle, responsive to determining that the generated exit event does not match an entry event, additional machine learning processes may be activated to compare entry and exit feature vectors and determine a match.

In an embodiment, an edge device generates an exit event for a vehicle exiting a parking facility. The edge device determines whether the exit event matches with an entry event. Responsive to determining that the exit event does not match to an entry event, the edge device inputs images of the vehicle into a model (e.g., a supervised machine learning model) and receives, as output from the model, an exit feature vector. The edge device retrieves entry feature vectors corresponding to hanging entry events. A hanging entry event is an entry event for a vehicle with an unknown vehicle identifier. Edge device inputs the exit feature vector and the entry feature vectors into a second model (e.g., an unsupervised machine learning model) and receives, as output from the model, matching scores for each entry feature vector. Edge device matches the exit event to one of the hanging entry events based on the matching scores.

Systems and methods are also disclosed herein that improve enforcement capabilities within parking facilities using computer vision and machine learning approaches while solving the aforementioned inefficiencies. In some embodiments, determinations as to whether an infraction has occurred are triggered when certain sensors flag the possibility that an infraction has occurred, and it is responsive to these sensors flagging this possibility that machine learning processes are activated to confirm that an infraction has in fact occurred. Moreover, using machine learning to generate fingerprints for vehicles associated with bad actors may be limited to scenarios where vehicles cannot otherwise be identified. Further approaches to performing enforcement in a computationally feasible manner are explored in detail below.

In an embodiment, an edge device detects an infraction caused by a vehicle by using sensors installed in a parking facility. The edge device generates a vehicle fingerprint by inputting images of the vehicle into a model (e.g., a supervised machine learning model) and receiving, as output from the model, a feature vector of the vehicle. At various parking facilities, the edge device monitors for the entry of the vehicle using the vehicle fingerprint and, responsive to detecting entry of the vehicle at a parking facility, triggers a remediation action.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
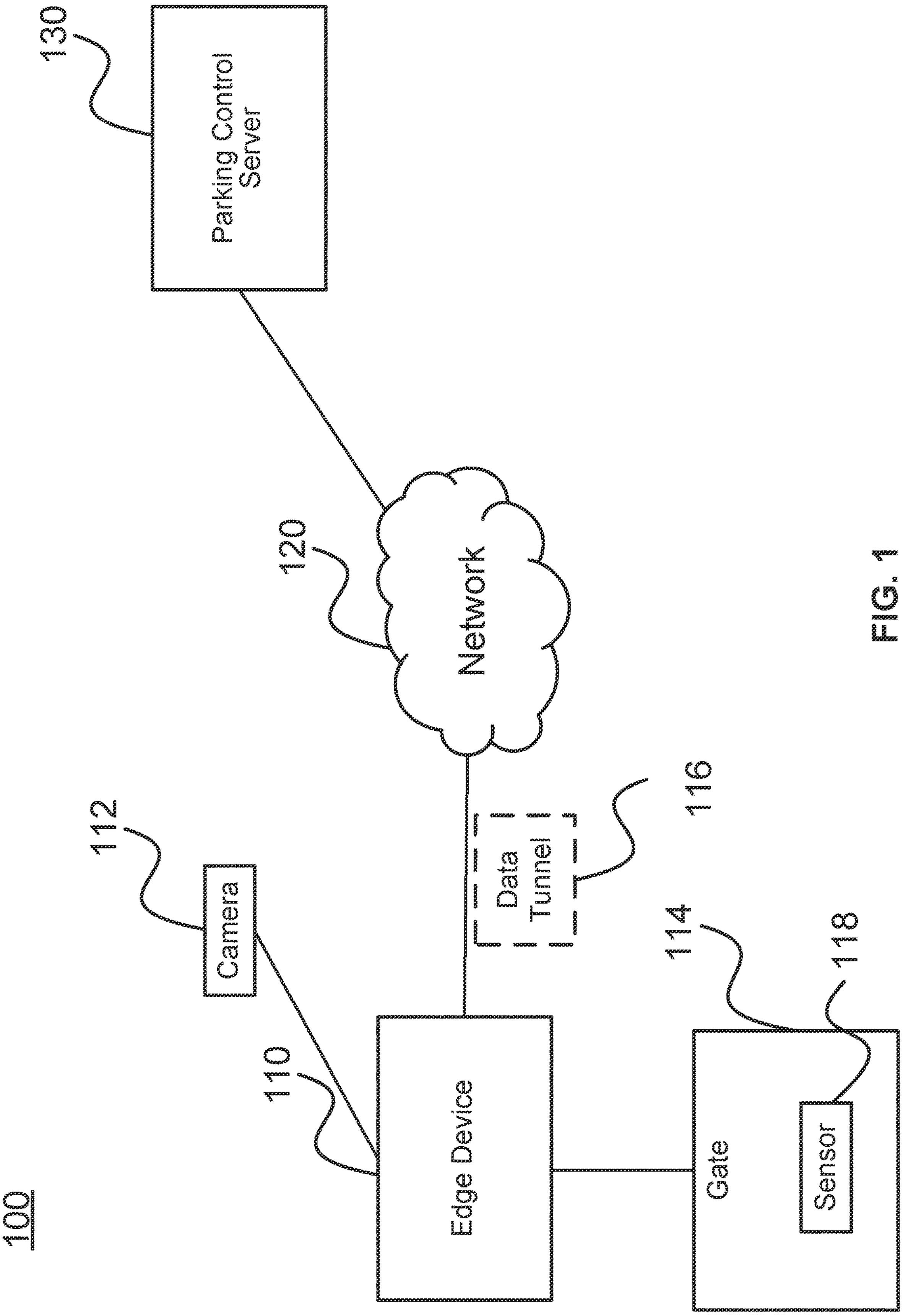
FIG. 1 illustrates one embodiment of a system environment for determining gate state using an edge device and a parking control server.

FIG. 1 illustrates one embodiment of a system environment for seamless parking gate operation using an edge device and a parking control server. As depicted in FIG. 1, environment 100 includes edge device 110, camera 112, gate 114, data tunnel 116, sensor 118, network 120, and parking control server 130. While only one of each feature of environment is depicted, this is for convenience only, and any number of each feature may be present. Where a singular article is used to address these features (e.g., "camera 112"), scenarios where multiples of those features are referenced are within the scope of what is disclosed (e.g., a reference to "camera 112" may mean that multiple cameras are involved).

Edge device 110 detects a vehicle approaching gate 114 using camera 112. Edge device 110, upon detecting such a vehicle, performs various operations (e.g., lift the gate; update a profile associated with the vehicle, etc.) that are described in further detail below with reference to at least FIG. 2. Camera 112 may include any number of cameras that capture images and/or video of a vehicle from one or more angles (e.g., from behind a vehicle, from in front of a vehicle, from the sides of a vehicle, etc.). Camera 112 may be in a fixed position or may be movable (e.g., along a track or line) to capture images and/or video from different angles. Where the term image is used, this may be a standalone image or may be a frame of a video. Where the term video is used, this may include a plurality of images (e.g., frames of the video), and the plurality of images may form a sequence that together form the video.

Gate 114 may be any object that blocks entry and/or exit from a facility (e.g., a parking facility) until moved. For example, gate 114 may be a pike that blocks entry or exit by standing parallel to the ground, and lifts perpendicular to the ground to allow a vehicle to pass. As another example, gate 114 may be a pole or a plurality of poles that block vehicle access until lowered to a position that is flush with the ground. Any form of blocking vehicle ingress/egress that is moveable to remove the block is within the context of gate 114. In some embodiments, no physical gate exists that blocks traffic from entering or exiting a facility. Rather, in such embodiments, gate 114 as referred to herein is a logical boundary between the inside and the outside of the facility, and all embodiments disclosed herein that refer to moving the gate equally refer to scenarios where a gate is not moved, but other processing occurs when an entry and exit match (e.g., record that the vehicle has left the facility). Yet further, gate 114 may be any generic gate that is not in direct communication with edge device 110. Edge device 110 may instead be in direct communication with a component that is separate from, but installed in association with, a gate, the component configured by installation to cause the gate to move.

Edge device 110 communicates information associated with a detected vehicle to parking control server 130 over network 120, optionally using data tunnel 116. Data tunnel 116 may be any tunneling mechanism, such as virtual private network (VPN). Network 120 may be any mode of communication, including cell tower communication, Internet communication, WiFi, WLAN, and so on. The information provided may include images of the detected vehicle. Additionally or alternatively, the information provided may include information extracted from or otherwise obtained based on the images of the detected vehicle (e.g., as described further below with respect to FIG. 2). Transmitting extracted information rather than the underlying images may result in bandwidth throughput efficiencies that enable real time or near-real-time movement of gate 114 by avoiding a need to transmit high data volume images.

In some embodiments, edge device 110 may apply computer vision to determine environmental factors around the vehicle. The term environmental factors, as used herein, may refer to features that influence traffic flow in the vicinity of gate 114, such as street traffic blocking egress from a facility, orientation of vehicles within images with respect to one another, and so on. In an embodiment, when instructing the moveable gate to move, edge device 110 applies parameters based on the determined environmental factors (e.g., wait to open gate 114 despite matching an exit to an entry due to a vehicle being ahead of the vehicle attempting to exit and therefore blocking egress).

Parking control server 130 receives the information from edge device 110 and performs operations based on that receipt. The operations may include storing the information, updating a profile, retrieving information related to the information, and communicating responsive additional information back to edge device 110. Parking control server 130 may control aspects of the parking facility, such as status lights above parking gates. The operations of parking control server 130 are described in further detail below with reference to at least FIG. 3.

Figure 2:
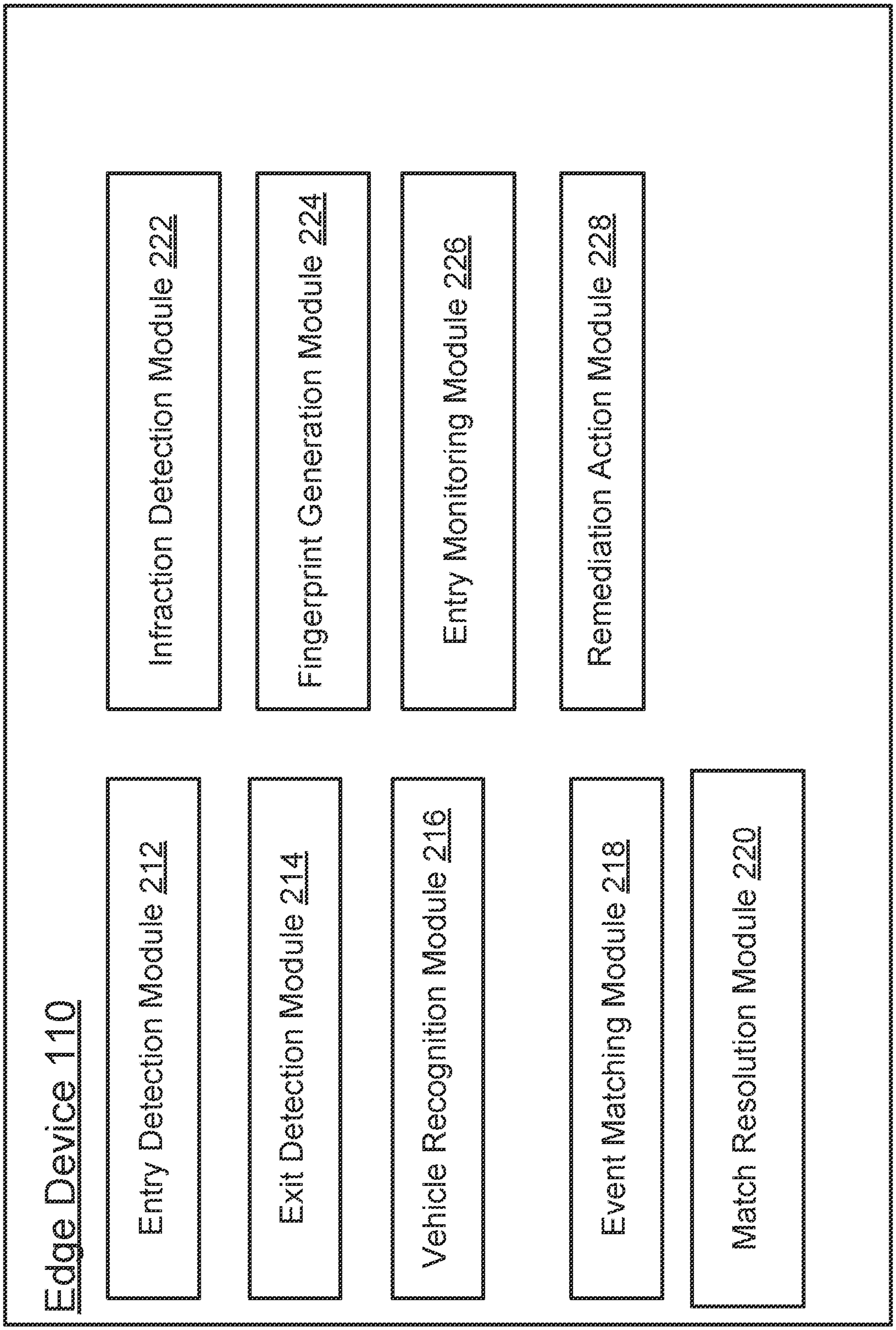
FIG. 2 illustrates one embodiment of exemplary modules operated by an edge device.

FIG. 2 illustrates one embodiment of exemplary modules operated by an edge device. As depicted in FIG. 2, edge device 110 includes entry detection module 212, exit detection module 214, vehicle recognition module 216, event matching module 218, match resolution module 220, infraction detection module 222, fingerprint generation module 224, entry monitoring module 226, and remediation action module 228. The modules depicted with respect to edge device 110 are merely exemplary; fewer or additional modules may be used to achieve the activity disclosed herein. Moreover, the modules of edge device 110 typically reside in edge device 110, but in various embodiments may instead, in part or in whole, reside in parking control server 130 (e.g., where images, rather than data from images, are transmitted to parking control server 130 for processing). In some embodiments, the modules and functionality of edge device 110 may in whole or in part be implemented in sensor 118.

Entry detection module 212 detects and stores an entry event. An entry event represents a vehicle approaching a parking facility from an entry side and entering the parking facility, in some embodiments through an entry gate. Entry detection module 212 may detect the entry event by using camera 112 to capture a series of images over time. Camera 112 may continuously capture images or may capture images when certain conditions are met (e.g., motion is detected, or any other heuristic such as during certain times of day). In an embodiment, edge device 110 may continuously receive images from camera 112 and may determine whether the images include a vehicle, in which case entry detection module 212 may perform processing on images that include a vehicle and discard other images. In an embodiment, entry detection module 212 may command camera 112 to only transmit images that include vehicles and may perform processing on those images. The captured images are in association with a moveable gate or logical boundary (e.g., gate 114), in that each camera 112 is either facing a gate or an area in a vicinity of a gate (e.g., just the entry side, just the exit side, or both). Each image may have a timestamp and/or a sequence number. Entry detection module 212 may associate all images that include a motion of a given vehicle from a time the vehicle enters the images until the time that the vehicle exits the images (e.g., during the time that the vehicle approaches the gate and then drives through or past the gate). In some embodiments, entry detection module 212 may, for images that include motion of the given vehicle, isolate portions of the images that contain the vehicle and exclude portions of the images that do not contain the vehicle (e.g., background, environment, other vehicles). For example, entry detection module 212 may put a bounding polygon on a portion of an image that contains the largest vehicle in the frame. From images that contain the vehicle, entry detection module 212 may further isolate or put bounding polygons around a portion of the image that contains a vehicle identifier, such as a license plate.

Entry detection module 212 may determine, from images featuring the vehicle, a data set corresponding to the vehicle. The data set may include parameters that describe attributes of the vehicle and a vehicle identifier. Parameters describing attributes of the vehicle may include both identifying attributes and direction attributes of the vehicle. Identifying attributes may include any information that is derivable from the images that describe the vehicle, such as make, model, color, type (e.g., sedan versus sports utility vehicle), height, length, bumper style, number of windows, door handle type, and any other descriptive features of the vehicle. Direction attributes may refer to absolute direction (e.g., cardinal direction) or relative direction (e.g., direction of the vehicle relative to an entry gate and/or relative to an assigned direction of a lane which the entry gate blocks (e.g., where different gates are used for entry and exit lanes, and where a vehicle is approaching a gate from an entrance to a parking facility through an exit lane, the direction would be indicated as opposite to an intended direction of the lane)). Direction attributes may also be determined relative to a camera's imaging access and are thus indicative of whether the vehicle is moving toward or away from the camera. In an embodiment, a single machine learning model is used to produce the entire data set, both the parameters and the vehicle identifier. In another embodiment, a first machine learning model is used to determine the parameters and a different second machine learning model is used to determine the vehicle identifier.

In the two-model approach, entry detection module 212 determines the parameters by inputting images featuring the vehicle into a first machine learning model, and receiving, as output from the first machine learning model, the parameters describing attributes of the vehicle. In an embodiment, the output of the first machine learning model may be more granular, and may include a number of objects in an image (e.g., how many vehicles), types of objects in the image (e.g., vehicle type information, or per-vehicle identifying attribute information), result scores (e.g., confidence in each object classification), and bounding boxes (e.g., of sub-segments of the image for downstream processing, such as of a license plate for use by the second machine learning model).

The first machine learning model may be trained to output identifying attributes using example data having images of vehicles that are labeled with one or more candidate identifying attributes. For example, various images from cameras facing gates may be manually labeled by users to indicate the above-mentioned attributes, such as, for each of the various images, a make, model, color, type, and so on of a vehicle. The first machine learning model may be a supervised model that is trained using the example data to predict, for new images, their attributes.

The first machine learning model may be trained to output direction attributes of the vehicle using example data, and/or to output data from which entry detection module 212 may determine some or all of the direction attributes. The example data may show motion of vehicles relative to one or more gates over a series of sequential frames, and may be annotated with a lane type (e.g., an entry lane versus an exit lane) and/or a gate type (e.g., exit gate versus entry gate), and may be labeled with a direction between two or more frames (e.g., toward an entry gate, away from an entry gate, toward an exit gate, away from an exit gate). Lane type may be derived by environmental factors (e.g., a model may be trained to recognize through enough example data that a direction past a gate that shows blue sky is an exit direction, and toward a halogen light is an entry direction). From this training, the first machine learning model may output direction directly based on learned motions relative to gate type and/or lane type, or may output lane type and/or gate type as well as indicia of directional movement, from which entry detection module 212 may apply heuristics to determine the direction attributes (e.g., toward entry gate, away from entry gate, toward exit gate, away from exit gate). That is, a direction vector along with a gate type and/or lane type may be output (e.g., environmental factors may be output along with the direction vector, which may include other information such as lighting, sky information, and so on), and the direction vector along with the environmental factors may be used to determine the direction attribute.

It is advantageous to determine direction attributes along with identifying attributes, as vehicles are being tracked as they move. However, determining direction attributes and identifying attributes in one step may result in false positives. With that being said, a separate model could be used for identifying attribute detection and for direction attribute detection, thus resulting in a three-model approach (two models being used for what above is referenced to as a "first machine learning model", each of those separate models trained separately using respective training data for each respective task.

Continuing with the two-model approach, entry detection module 212 determines the vehicle identifier by inputting images featuring a depiction of a license plate of the vehicle into a second machine learning model. That is, rather than using optical character recognition (OCR), the second machine learning model may be used to decipher a license plate of the vehicle into a vehicle identifier of the vehicle. OCR methods are often inaccurate for license plate detection due to complexity of license plates, where different fonts (e.g., cursive versus script) are used, often against complex picture-filled backgrounds, different colors, and lighting issues. Moreover, various license plate types are difficult to accurately read because they often include slogans that are not generalizable. Even minor accuracies in OCR readings where one character or a geographical identifier determination is off could cause could result in an inability to effectively identify a vehicle.

To this end, the second machine learning model may be trained to identify and output both a geographical nomenclature and a string of characters of a vehicle identifier (e.g., either directly, or with a confidence score that exceeds a threshold applied by entry detection module 212). As used herein, the term "geographical nomenclature" may refer to a manner of identifying a jurisdiction that issued the license plate. That is, in the United States of America, an individual state would issue a license plate, and the geographical identifier would identify that state. In some jurisdictions, a country-wide license plate is issued, in which case the geographical identifier is an identifier of the country. A geographical identifier may identify more than one jurisdiction (e.g., in the European Union (EU), some license plates identify both the EU and the member nation that issued the license plate; the geographical identifier may identify both of those places or just the member nation). The term "string of characters" may refer to a unique symbol issued by the jurisdiction to uniquely identify the vehicle, such as a "license plate number" (which may include numbers, letters, and symbols). That is, for each given jurisdiction, the string of characters is unique relative to other strings of characters issued by that given jurisdiction. In some embodiments, a license plate number for a vehicle may include a string of characters where the characters are both vertically written (e.g., read from top to bottom) and horizontally written (e.g., read from left to right). The term "license plate identifier" may refer to the combination of the geographical nomenclature and the license plate number.

To train the second machine learning model, training examples of images of license plates are used, where the training examples are labeled. In an embodiment, the training examples are labeled with both the geographical jurisdiction and with characters that are depicted within the image. The characters may be individually labeled (e.g., by labeling segments of the image that include the segment), the whole image may be labeled with each character that is present, or a combination thereof. For strings of characters including both vertically and horizontally written characters, the string may be labelled in a standardized format, such as with a left to right, top to bottom rule (e.g., a license plate $$6{}^{C}_{D}7890$$

may be labelled as AB12345, and a license plate $${}^{A}_{B}12345$$

may be written as 6CD7890). In some embodiments, training examples may only be labeled by whether they include both vertically and horizontally written characters, and the second machine learning model predicts for a new image of a license plate whether the license plate number includes both vertically and horizontally written characters. Following this prediction, entry detection module 212 may apply a third machine learning model to license plates with vertically and horizontally written characters, the third machine learning model trained specifically to predict the license plate numbers for license plates with both vertically and horizontally written characters.

In an embodiment, the training examples may be labeled only with the geographical jurisdiction, and the second machine learning model predicts for a new image of a license plate the geographical jurisdiction. Following this prediction, a third machine learning model from a plurality of candidate machine learning models may be selected, each of the candidate machine learning models corresponding to a different geographical jurisdiction and trained to predict characters of the string of characters from training examples specific to its respective geographical jurisdiction, the selected third machine learning model selected based on the predicted geographical jurisdiction. The third machine learning model may be applied to the image or segments thereof that contain each character, thus resulting in a prediction from training examples specific to that jurisdiction.

In any case, the training examples may show examples in any number of conditions, from low lighting conditions, dirty license plate conditions where characters are partially or fully occluded, license plate frame conditions where geographical identifiers (e.g., the word "New York") are partially or fully occluded, license plate covers render characters hard to directly read, and so on. Advantageously, by using machine learning to predict geographical nomenclature and strings of characters, accuracy is improved relative to OCR, as even where partial occlusion occurs or lighting conditions make characters difficult to read, the second machine learning model is able to accurately predict the content of the license plate.

In a one-model approach, the manners of training the first and second machine learning model would be applied to a single model, rather than differentiating what is learned between the two models. This would result in an advantage of providing all inputs as one data set to a model, but could also result in a disadvantage of a less specialized model that has noisier output. Moreover, data and time intensive to train one large model to perform all of this functionality. The large model may be slower and have a lower quality of output than using two separate models. The two-model approach additionally allows for a "fail fast" processing to happen—that is, detect a vehicle and perform processing based on that detection, even before other activity (e.g., license plate reading) is completed.

Regardless of what model approach is used, in an embodiment, entry detection module 212 may determine, from direction attributes of the vehicle, whether the direction attributes of the vehicle are consistent with the function of the entry gate, thus confirming that the vehicle performed an entry event. Namely, the entry detection module 212 determines that the vehicle used or is using the entry lane as opposed to the exit lane. In some embodiments, the entry detection module 212 may move the gate to enable entry to the facility that is blocked by the gate (or where the gate is a logical boundary, record that the vehicle has entered the facility without a need to move the gate).

In some embodiments, entry detection module 212 may determine a feature vector corresponding to the entry event, an "entry feature vector." To produce the entry feature vector, the entry detection module 212 inputs a depiction of the vehicle into a supervised machine learning model. The depiction of the vehicle may include the images that include the vehicle, for example as captured by camera 112. In some embodiments, the depiction of the vehicle may include only the isolated portions of the images that contain the vehicle. In some embodiments, the depiction of the vehicle may include other data, such as data from the data set. The supervised machine learning model outputs the entry feature vector. The entry feature vector may include a plurality of embeddings, where each embedding is derived from one or more dimensions of the depiction of the vehicle. The supervised machine learning model may be trained to output a feature vector. In some embodiments, the supervised machine learning model may be trained such that feature vectors corresponding to different vehicles have a maximum amount of distance from each other in the feature space. For example, the supervised machine learning model may be trained such that a feature vector is penalized based on angular margins between the feature vector and other feature vectors, where the smaller the angular margins, the greater the penalties. This training results in a greater distance between feature vectors.

In some embodiments, the supervised machine learning model may be a multi-task model, such as a multi-task neural network with branches that are each trained to determine different parameters. The structure of the multi-task model has a set of shared layers and a plurality of branching task-specific layers, each branch of the branching task-specific layers corresponding to a task. The tasks are related within the domain, meaning that each of the tasks determines parameters that are determinable based on a highly overlapping information space. For example, in determining the entry feature vector for the vehicle, the different tasks may predict the license plate of the vehicle, the make and model of the vehicle, and so on. As such, when trained, the shared layers produce information that is useful for performing each of tasks and outputting each of these predictions. Embeddings of the one or more of the shared layers may be used to produce a feature vector.

While the model that entry detection module 212 uses to produce the entry feature vector is described as a supervised machine learning model, a supervised machine learning model is merely exemplary. Entry detection module 212 may use other types of models to generate entry feature vectors. For example, entry detection module 212 may use a classification model (e.g., a logistic regression, decision tree, random forest, or naive bayes model) to classify the vehicle in the entry event.

As described later with respect to event matching module 218 and match resolution module 220, the process to match an entry event and an exit event (e.g., a representation of a vehicle exiting the parking facility) may not always require the entry detection module 212 to generate a feature vector. Event matching module 218 may match entry and exit events without using feature vectors. For example, if the vehicle is a known vehicle, event matching module 218 may match an entry event to an exit event based on the vehicle's vehicle identifier alone. Or, in another example, event matching module 218 may match entry events to exit events based on the data set of the entry and exit events, for example matching based on type, model, and color of vehicle. However, responsive to event matching module 218 not finding a match between an entry and exit event, match resolution module 220 may attempt to match entry and exit events using feature vectors. Match resolution module 220 may request feature vectors from entry detection module 212. As such, in some embodiments, to avoid generating feature vectors when they may not necessarily be used in the matching process, entry detection module 212 may hold off on generating a feature vector responsive to detecting entry of a vehicle and instead produce an entry feature vector responsive to receiving a request from match resolution module 220. This approach saves on computer resources (e.g., processing power, memory) by first attempting less computationally expensive means to match entry and exit events before producing feature vectors.

Entry detection module 212 may store the entry event corresponding to the vehicle in entry data database 358 of the parking control server 130. The entry event corresponding to the vehicle includes the data set corresponding to the vehicle (e.g., the parameters and the vehicle identifier) and, in some embodiments, the entry feature vector, images featuring the vehicle, timestamps corresponding to the entry (e.g., time stamps and/or sequence numbers of the images), and the parking facility the vehicle entered. In an embodiment, the entry detection module 212 may store the entry event at edge device 110.

Exit detection module 214 operates in a manner similar to entry detection module 212, in that machine learning is applied in in a similar manner in order to detect an exit event. That is, a data set and/or feature vector identical to that determined when a vehicle performs an entry motion is performed for an exit motion, where it is detected that a vehicle is approaching gate 114 to exit a facility. When an exit motion is detected (e.g., where a vehicle is determined to have directional attributes consistent with approaching a gate designated for use as an exit), exit detection module 214 determines that an exit event may have occurred (e.g., and other activity such as generation and storage (e.g., in exit data database 360) of a data structure or a feature vector as described with respect to entry events may be performed). In some embodiments, exit detection module 214 may determine the feature vector in response to the edge device 110 determining that an exit event does not match an entry event.

Vehicle recognition module 216 determines if a vehicle is a known vehicle. A known vehicle is a vehicle with a profile stored in profile database 356. Vehicle recognition module 216 may retrieve the vehicle identifier (e.g., license plate) from the entry event associated with the vehicle (e.g., stored in entry data database 358). Vehicle recognition module 216 may search the profile database 356 using the vehicle identifier as an index. Responsive to finding an entry in profile database 356 that corresponds to the vehicle identifier, vehicle recognition module 216 determines that the vehicle is known. Vehicle recognition module 216 may determine if a vehicle is a known vehicle responsive to a vehicle entering or exiting the parking facility and as such may update the respective entry data database 358 or exit data database 360 with the vehicle identifier or with an indication that the vehicle is known and has a profile in profile database 356.

Event matching module 218, responsive to exit detection module 214 detecting an exit event, determines whether a match exists between the detected exit event and an entry event. Namely, event matching module 218 determines if a vehicle corresponding to an entry event is the same as the vehicle corresponding to the exit event. In some embodiments, the event matching process may be as simple as determining whether the vehicle corresponding to the exit event is known and matching the exit event to an entry event corresponding to the known vehicle. Event matching module 218 determines whether the vehicle corresponding to the exit event is known by using vehicle recognition module 216, which relies on the vehicle identifier (e.g., license plate) to search profile database 356 for a profile of the vehicle. Responsive to determining that the vehicle corresponding to the exit event is a known vehicle, event matching module 218 may search either entry data database 358 or profile database 356 with the vehicle identifier to determine if there exists a record of the known vehicle entering the parking facility. Responsive to finding an entry event for the known vehicle, event matching module 218 matches the exit event with the entry event.

However, license plate reading, even using the described second machine learning model, is not perfect. Factors such as low image quality, low frame rate, lighting conditions (e.g., glare, low lighting), debris, dirt, or weather-related conditions (e.g., snow, ice, rain, mud) may obscure license plate information and make license plates difficult to read. As such, vehicle recognition module 216 may be unable to determine whether the vehicle is known based on the vehicle identifier, and as a result the event matching module 218 may not be able to match the exit event to the entry event using the vehicle identifier alone.

In some embodiments, event matching module 218 matches the exit event to an entry event by comparing information in the data set of the exit event to information in the data set of an entry event of a set of entry events. Event matching module 218 determines a match between the exit event and an entry event of the set of entry events where heuristics are satisfied. For example, event matching module 218 may determine that the exit event matches an entry event if the license plate number and geographical nomenclature match. Because license plate numbers are not unique identifiers and can be duplicated so long as the geographical nomenclature is unique, if the exit event and an entry event match between license plate numbers but not between geographical nomenclatures, event matching module 218 would not match the exit event with the entry event. As previously described, because license plate reading is not perfect, it may be the case that a match is not found by event matching module 218 using the vehicle identifier alone. To this end, a match may be determined based on other identifying information from the data sets of the exit and entry events, such as identifying a partial match of a geographical nomenclature and/or other vehicle attributes that match such as make, model, color, and so on. Any heuristics may be programmed to determine whether or not a match has occurred.

Event matching module 218 may filter the entry events to compare the exit event to. For example, event matching module 218 may compare the exit event only to unmatched entry events, to entry events associated with the same parking facility, or to entry events with timestamps within a threshold time window (e.g., within a 24-hour time window). Event matching module 218 may filter entry events such that the set of entry events includes events associated with vehicles of the same type (e.g., car or truck), color, or model as the vehicle associated with the entry event.

Responsive to detecting a match, event matching module 218 may instruct parking control server 130 to indicate in profile database 356, entry data database 358, or the exit data database 360 that the vehicle has exited the facility. For example, event matching module 218 may instruct parking control server 130 to delete the entry event and exit event of the vehicle or to archive them in a separate database. In some embodiments, responsive to detecting a match, event matching module 218 may raise gate 114 (e.g., where gate 114 is a physical gate rather than a logical boundary), thus allowing the vehicle to exit the facility.

Responsive to not detecting a match, event matching module 218 may expand the set of entry events that the exit event could be matched to and retry the matching process. For example, event matching module 218 may expand the set of entry events to include entry events associated with parking facilities beyond the parking facility associated with the exit event, such as parking facilities within a threshold distance from the parking facility associated with the exit event. In another example, event matching module 218 may expand the time window the entry events are associated with, for example to include entry events that took place within a month instead of within a day.

In some embodiments, responsive to not detecting a match between the exit event and an entry event, event matching module 218 may refer to match resolution module 220.

Match resolution module 220 resolves matches between exit events and hanging entry events. A hanging entry event is an entry event for a vehicle where entry detection module 212 was unable to identify a vehicle identifier. Match resolution module 220 may determine (e.g., by exit detection module 214) or retrieve (e.g., from exit data database 360) an exit feature vector corresponding to the exit event. Match resolution module 220 may determine (e.g., by entry detection module 212) or retrieve (e.g., from entry data database 358) a set of entry feature vectors corresponding to a set of hanging entry events. Match resolution module 220 may input the exit feature vector and the set of entry feature vectors into an unsupervised machine learning model.

The unsupervised machine learning model may output a matching score for each entry feature vector. The matching score may represent how well the entry event matches with the exit event such that better matches have higher matching scores. In these embodiments, match resolution module 220 may match the exit event with an entry event based on the matching scores. For example, match resolution module 220 may automatically match the exit event with the entry event that has the highest matching score. In other embodiments, match resolution module 220 may compare the match scores to a threshold score. Responsive to the highest match score exceeding the threshold score, match resolution module 220 may determine the entry event with the highest match score to be a match with the exit event. Responsive to the match scores not exceeding the threshold score, match resolution module 220 may determine that there is no match for the exit event. In some embodiments, match resolution module 220 may compare the difference between the two highest two match scores to a threshold difference and, only in response to the difference exceeding the threshold difference, match the exit event with the entry event with the highest match score. Thus, if the top two entry events are similarly well-matched to the exit event (e.g., with match scores within the threshold difference from one another), match resolution module 220 may determine that there is no match for the exit event. In other embodiments, the match resolution module 220 may provide, for display, a subset of entry events for an administrator to manually select a match for the exit event.

In some embodiments, match resolution module 220 may resolve hanging entry events without waiting for a matching exit event. To do so, match resolution module 220 may match a hanging entry event to a previous entry event, where the previous entry event corresponds to a known vehicle. Match resolution module 220 may determine or retrieve an entry feature vector corresponding to the hanging entry event and determine or retrieve (e.g., from entry data database 358) a set of entry feature vectors corresponding to previous entry events. Match resolution module 220 may input the entry feature vector corresponding to the hanging entry event and the set of entry feature vectors corresponding to previous entry events into an unsupervised machine learning model. The unsupervised machine learning model may output a matching score for each entry feature vector that corresponds to a previous entry event.

While the model that match resolution module 220 uses to resolve matches between exit events and hanging entry events is described as an unsupervised machine learning model, an unsupervised machine learning model is merely exemplary. Match resolution module 220 may use other types of models to generate entry feature vectors. For example, match resolution module 220 may use a mathematical model that uses cosine similarity to compute the similarity between exit and entry feature vectors.

Match resolution module 220 may select the set of previous entry events. Match resolution module 220 may select entry events that the entry detection module 212 detected within a window of time, such as a window of the last three days. Match resolution module 220 may select entry events that occurred at the same parking facility as the hanging entry event. Match resolution module 220 may select entry events with vehicles of the same type (e.g., truck, SUV, sedan), model, or color as the vehicle corresponding to the hanging entry event. In some embodiments, match resolution module 220 may start by selecting a smaller set of previous entry events where a match may be more likely (e.g., entry events that occurred at the same parking facility in the last 3 days), and, responsive to not resolving a match between the hanging entry event and the selected set of previous entry events, iteratively select larger and larger sets of previous entries with which to retry the matching process (e.g., entry events that occurred within the last month at parking facilities within 20 miles of the parking facility associated with the hanging entry event). Match resolution module 220 may use metrics like retention to further inform selection of the set of previous entry events. For example, if retention (e.g., the rate of vehicles returning to the same parking facility) is 80% in one month, match resolution module 220 may select the set of previous entry events to be entry events that occurred at the same parking facility within one month. However, if retention is 30% in one month, match resolution module 220 may select the set of previous events to be entry events that occurred at a group of parking facilities (e.g., within the same zip code, within a threshold distance) instead of the same parking facility within one month. By using an iterative search process to check sets of previous events where a match is more likely before expanding to check larger sets of previous events, match resolution module 220 may save on time as well as computational resources (e.g., processing power, storage, etc.).

Responsive to the event matching module 218 or match resolution module 220 matching the exit event with an entry event, in some embodiments edge device 110 may update profile database 356 of the parking control server with any or all events, data sets or feature vectors that describe the vehicle. If the vehicle does not have a profile in profile database 356, edge device 110 may request for parking control server 130 to create a profile for the vehicle. If the vehicle does have an existing profile in profile database 356, edge device 110 may request for parking control server 130 to update the profile with new information corresponding to the vehicle (events, data sets, feature vectors). In some embodiments, edge device 110 may update the entry data database 358 and the exit data database 360 to reflect the match between an exit event and an entry event (e.g., removing entries or indicating that the event is matched).

Responsive to the event matching module 218 or match resolution module 220 not detecting a match, edge device 110 or parking control server 130 may provide a message for display to the user of the vehicle corresponding to the exit event. The message may include an indication that the user's vehicle was unable to be matched and/or a request for the user to manually enter vehicle information (e.g., license plate information) or create a profile. The parking facility may display the message on a screen, for example a screen located at the exit gate.

Infraction detection module 222 detects infractions caused by vehicles and triggers remediation actions responsive to detecting entry of those vehicles. An infraction may be a violation of rules associated with the parking facility. A set of non-exhaustive examples of infractions may include damaging gates of the parking facility (e.g., bumping into or crashing through entry or exit gates), damaging other vehicles in the parking facility, entering the parking facility with no profile associated with the vehicle, speeding within the parking facility, taking up more than one parking space, parking outside of a parking space, or staying within the parking facility during restricted hours (e.g., overnight, past closing time, for too long a time period). In some embodiments, infraction detection module 222 may detect infractions caused by users of the parking facility, both users associated with vehicles and users not associated with vehicles. Infractions caused by users may, for example, include damaging, breaking into, or stealing vehicles.

Infraction detection module 222 may detect an infraction based on sensor data. Sensor data may include data from camera 112, sensor 118 attached to gate 114, a parking sensor, an audio sensor, a speedometer, or from any other type of sensor in the parking facility. A parking sensor detects when a vehicle is in a parking space. Example parking sensors include magnetometers, ultrasonic sensors, or optical sensors. Infraction detection module 222 may use different sensors for different types of infractions. For example, infraction detection module 222 may use sensor 118 to detect if a gate has moved from one of the operating states (e.g., open, closed) to a state of being ajar, which may indicate that a vehicle bumped into the gate. In another example, infraction detection module 222 may use an audio sensor to detect when a vehicle is broken into (e.g., by detecting the sound of glass shattering or a car alarm).

In some embodiments, infraction detection module 222 may use multiple sensors in combination to detect the infraction. For example, infraction detection module 222 may use camera 112 and a combination of parking sensors to determine if a vehicle is in more than one parking space. Responsive to two or more parking sensors for two or more adjacent parking spaces detecting that the parking spaces have transitioned from a vacant state (e.g., no vehicle detected) to an occupied state (e.g., vehicle detected) within a threshold amount of time, infraction detection module 222 may detect an infraction. Infraction detection module 222 may use camera 112 data to confirm whether the instance of two parking sensors for adjacent parking spots detecting vehicles at the same time included the parking sensors detecting two or more separate vehicles that happened to pull in at the same time or detecting one vehicle taking up multiple parking spaces. In another example, infraction detection module 222 may use an audio sensor to detect the sounds of shattering glass and a car alarm and use camera 112 to confirm an infraction involving a user breaking into a vehicle.

In some embodiments, infraction detection module may use a moveable camera system. A set of non-exhaustive examples of moveable camera systems include a camera on wheels (e.g., on a vehicle), a camera configured to move along a wire or beam running across a ceiling, and/or a drone camera. Infraction detection module 222 may command the moveable camera system to navigate to the location of the infraction. For example, infraction detection module 222 may command the moveable camera system to navigate to a vantage point comprising the aforementioned adjacent parking spaces, capture images of the adjacent parking spaces, and determine whether the vehicle is occupying the adjacent parking spaces. In some embodiments, infraction detection module 222 may command the moveable camera system to navigate to the location of the infraction responsive to sensor data from another sensor (e.g., parking sensor) detecting the infraction. In some embodiments, infraction detection module 222 may command the moveable camera system to periodically move through the parking facility, scanning for infractions. For detecting infractions, a moveable camera system may be more efficient than a system with many stationary cameras as it reduces resources required to install cameras throughout a parking facility and maintain the cameras (e.g., power the cameras while the parking facility is open). Moreover, by triggering navigation of the moveable camera system responsive to detection of certain sensor data, fuel, energy, and processing of images from the moveable camera system is minimized to only scenarios where the possibility of an infraction is first detected, thereby improving efficiency.

In some embodiments, infraction detection module 222 may log the infraction in infraction database 362 along with other information associated with the infraction (e.g., timestamp).

Fingerprint generation module 224 generates a vehicle fingerprint in response to the detection of an infraction. A vehicle fingerprint for an infracting vehicle may include a feature vector corresponding to the vehicle, an "infraction feature vector." The fingerprint may include other information associated with the vehicle, for example a vehicle identifier or various vehicle parameters. Fingerprint generation module 224 generates the vehicle fingerprint by inputting a depiction of the vehicle into a model (e.g., a supervised machine learning model). The depiction of the vehicle may include the images that include the vehicle, for example as captured by camera 112. The model may be similar to the supervised machine learning model or other models described with respect to entry detection module 212 and thus may be trained as discussed with respect to entry detection module 212. Fingerprint generation module 224 receives, as output from the model, an infraction feature vector describing the vehicle involved in the detected infraction. The infraction feature vector may include a plurality of embeddings, where each embedding is derived from one or more dimensions of the depiction of the vehicle. In some embodiments, fingerprint generation module 224 adds the infraction feature vector to an infraction database, such as infraction database 362. In some embodiments, fingerprint generation module 224 generates a vehicle fingerprint without the detection of an infraction.

In embodiments where infraction detection module 222 detects an infraction caused by a user, fingerprint generation module 224 may determine a vehicle associated with the user and generate a vehicle fingerprint for the user's vehicle. To do so, fingerprint generation module 224 may retrieve a timestamp of the infraction from infraction database 362. Fingerprint generation module 224 may access sensor data (e.g., RFID reader on a locked pedestrian door to the parking facility, camera 112) within a threshold time window around the timestamp of the infraction. Using the sensors, fingerprint generation module 224 may determine how the user entered the parking facility. Responsive to determining that the user entered through an RFID-enabled pedestrian door to the parking facility, fingerprint generation module 224 may access logs associated with the pedestrian door and access a set of user credentials through which the user gained entry into the parking facility. User credentials may include user information, such as user profile information, through which fingerprint generation module 224 may obtain the vehicle identifier associated with the user. Responsive to determining that the user entered the parking facility in a vehicle, fingerprint generation module 224 may obtain the vehicle information stored in the entry log associated with the vehicle. Such embodiments are further described with respect to FIG. 7A.

In some embodiments, fingerprint generation module 224 determines whether the vehicle is unknown and generates a vehicle fingerprint in response to the vehicle being unknown. The vehicle may be determined by fingerprint generation module 224 to be unknown responsive to determining that the vehicle does not exist in profile database 356 or if the vehicle identifier (e.g., geographical nomenclature and license plate number) for the vehicle is not recognized. To determine if the vehicle is unknown, fingerprint generation module 224 may extract the vehicle identifier from the vehicle using a model similar to the supervised machine learning model described with respect to entry detection module 212. Fingerprint generation module 224 may search the profile database 356 using the vehicle identifier as an index. Responsive to determining that the vehicle is known, fingerprint generation module 224 may use an existing feature vector of the vehicle (e.g., an entry or exit feature vector stored in profile database 356) as the infraction feature vector of the vehicle fingerprint.

Entry monitoring module 226 monitors for the entry of vehicles associated with infractions to any of a plurality of parking facilities. At each parking facility, entry monitoring module 226 may receive, from entry detection module 212, a data set and/or entry feature vector corresponding to a vehicle entering the parking facility. Entry monitoring module 226 may compare the entry feature vector of the vehicle to vehicle fingerprints stored in the infraction database. In some embodiments, entry monitoring module 226 may input the entry feature vector and a set of infraction feature vectors (e.g., from vehicle fingerprints) into a model and receive, as output from the model, a match score for each infraction feature vector. The model may be similar to the unsupervised machine learning model of match resolution module 220. The entry monitoring module 226, similarly to match resolution module 220, may match the entry feature vector to an infraction feature vector of the set of infraction feature vectors based on the matching scores.

Remediation action module 228 triggers a remediation action responsive to entry monitoring module 226 detecting the entry of a vehicle associated with an infraction. Example remediation actions include issuing an infraction (e.g., parking ticket or other citation), contacting an administrator of the parking facility, contacting an external authority (e.g., law enforcement), deploying an exit or entry blocking device that prevents movement of the vehicle within the parking facility (e.g., metal bars, tire shredder, closing or not opening the gate), displaying a message to a user associated with the vehicle, or otherwise requesting an action from the user (e.g. email, text, or push notification). An example remediation action is shown with respect to FIG. 7C.

In some embodiments, remediation action module 228 trigger different remediation actions for different types of infractions. As such, remediation action module 228 may determine the type of infraction and transmit a remediation command resulting in the remediation action based on the infraction type. For example, for the infraction of entering the parking facility with no profile associated with the vehicle, the remediation action module 228 may trigger an action prompting a user of the vehicle to enter profile details (e.g., contact information, license plate number). In another example, for the infraction of taking up multiple parking spaces, remediation action module 228 may trigger a remediation action that allocates for the use of the multiple parking spaces. For the infraction of damaging a gate, remediation action module 228 may trigger a remediation action of contacting an administrator of the parking facility. In some embodiments, remediation action module 228 may trigger different remediation actions depending on the parking facility. Remediation action module 228 may store remediation action preferences for different parking facilities, for example in parking facility preferences storage 364 of parking control server 130. In some embodiments, remediation action module 228 may trigger multiple remediation actions. For example, remediation action module 228 may trigger two remediation actions at once. Additionally or alternatively, remediation action module 228 may trigger a first a remediation action and wait a threshold window of time before cancelling or triggering a second remediation action. For example, remediation action module may issue a message to a user and wait ten minutes before contacting law enforcement. Responsive to the user resolving the issue within the threshold time window, remediation action module 228 may cancel the second remediation action. Responsive to the user not resolving the issue within the threshold time window, remediation action module 228 may trigger the second remediation action.

Remediation action module 228 may remove the vehicle from the infraction database. Remediation action module 228 may remove the vehicle from the infraction database in response to a request from an administrator of a parking facility or in response to the user of the vehicle performing a remediation response corresponding to the remediation action (e.g., creating a profile, addressing a citation, etc.).

Figure 3:
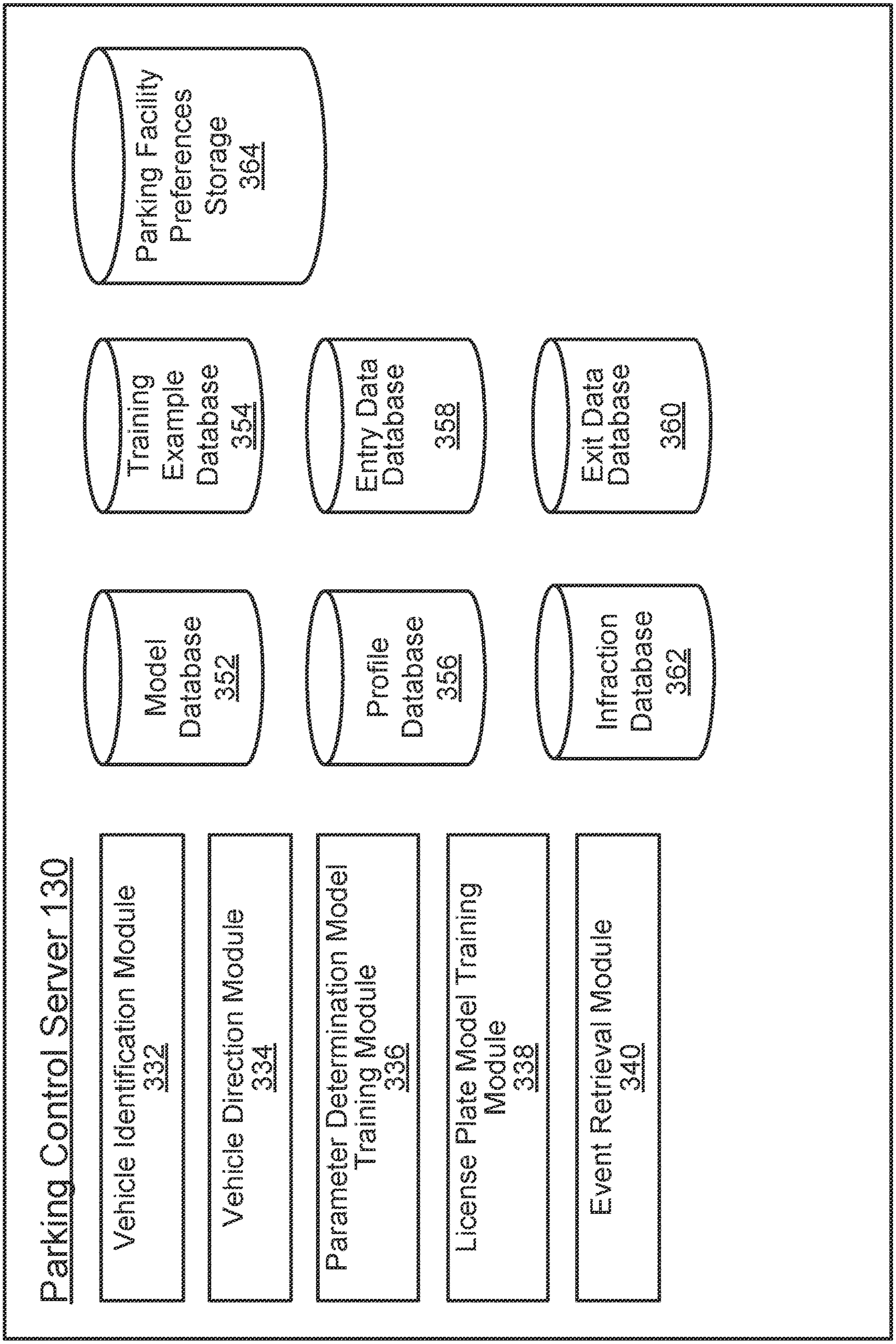
FIG. 3 illustrates one embodiment of exemplary modules operated by a parking control server.

FIG. 3 illustrates one embodiment of exemplary modules operated by a parking control server. As depicted in FIG. 3, parking control server 130 includes vehicle identification module 332, vehicle direction module 334, parameter determination model training module 336, license plate model training module 338, event retrieval module 340, model database 352, profile database 356, training example database 354, entry data database 358, exit data database 360, infraction database 362, and parking facility preferences storage 364. The modules and databases depicted in FIG. 3 are merely exemplary, and fewer or more modules and/or databases may be used to achieve the activity that is disclosed herein. Moreover, the modules and databases, though depicted in parking control server 130, may be distributed, in whole or in part, to edge device 110, which may perform, in whole or in part, any activity described with respect to parking control server 130. Yet further, the modules and databases may be maintained separate from any entity depicted in FIG. 1 (e.g., determination model training module 336 and license plate training module 338 may be housed entirely offline or in a separate entity from parking control server 130).

Vehicle identification module 332 identifies a vehicle using the first machine learning model described with respect to entry detection module 212. In particular, vehicle identification module 332 accesses the first machine learning model from model database 352, and applies input images and/or any other data to the machine learning model, receiving parameters of the vehicle therefrom. Vehicle identification module 332 acts in the scenario where images are transmitted to parking control server 130 for processing, rather than being processed by edge device 110. Similarly, vehicle direction module 334 determines a direction of a vehicle within images captured at edge device 110 by cameras 112 in the manner described above with respect to entry detection module 212, except by using images and/or other data received at parking control server 130 as input, rather than being processed by edge device 110.

Parameter determination model training module 336 trains the first machine learning model to predict parameters of vehicles in the manner described above with respect to entry detection module 212. Parameter determination model training module may additionally train the first machine learning model to predict direction of a vehicle. Parameter determination model training module may access training examples from training example database 354 and may store the models at model database 352. Similarly, license plate model training module 338 may train the second machine learning model using training examples stored at training example database 354 and may store the trained model at model database 352.

Event retrieval module 340 receives instructions from event matching module 218 to retrieve entry data from entry data database 358 that matches detected exit data, and returns at least partially matching data and/or a decision as to whether a match is found to event matching module 218. Event retrieval module 340 optionally stores the exit data to exit data database 360.

Profile database 356 stores profile data for vehicles that are encountered. For example, identifying information and/or license plate information may be used to index profile database 356. As a vehicle enters and exits facilities, profile database 356 may be populated with profiles for each vehicle that store those entry and exit events. Profiles may indicate owners and/or drivers of vehicles and may indicate contact information for those users. Event retrieval module 340 may retrieve contact information when an event is detected and may initiate communications with the user (e.g., welcome to parking facility message, or other information relating to usage of the facility).

Figure 4:
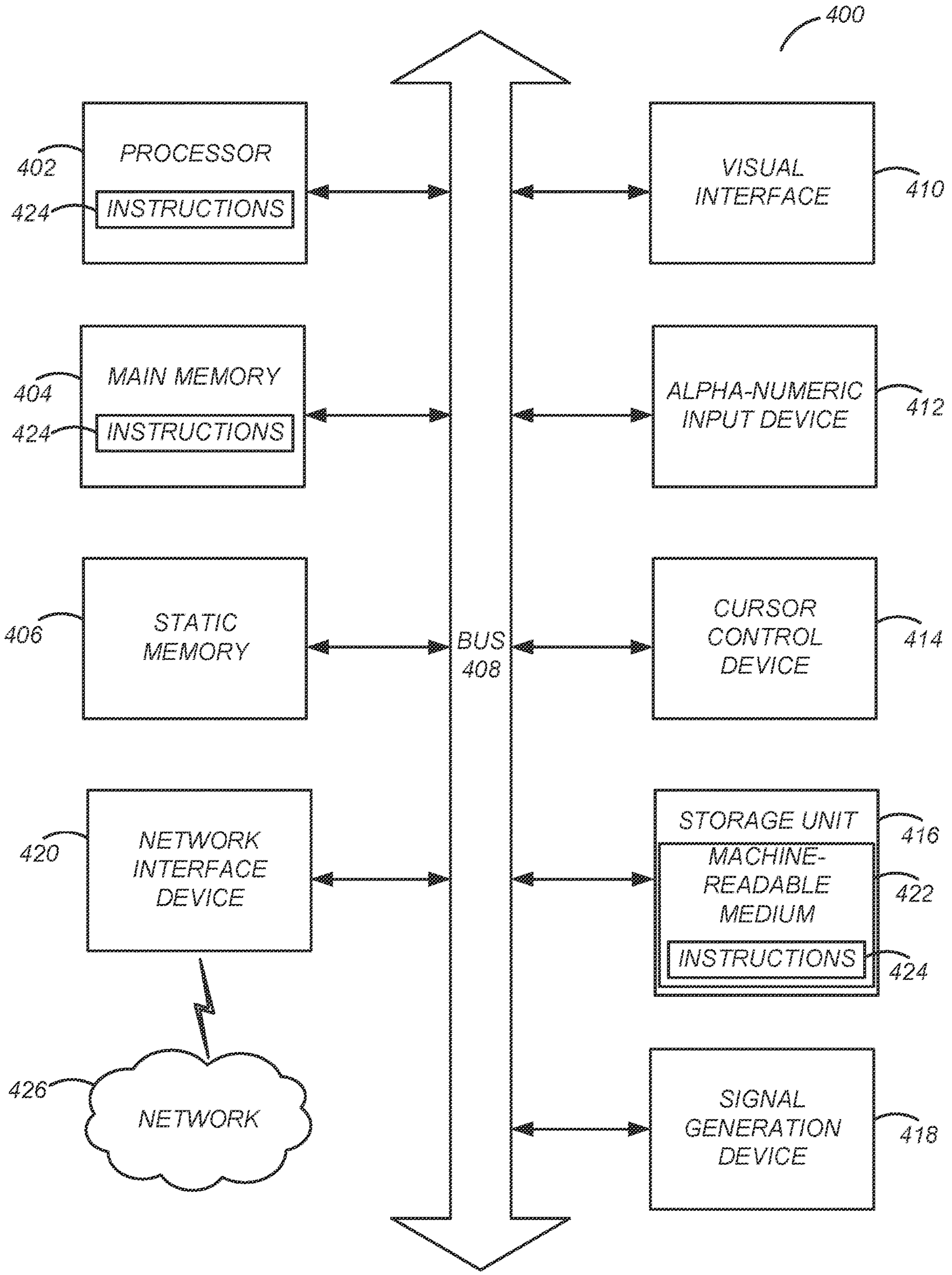
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). FIG. (FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 404, and a static memory 406, which are configured to communicate with each other via a bus 408. The computer system 400 may further include visual display interface 410. The visual interface may include a software driver that enables (or provide) user interfaces to render on a screen either directly or indirectly. The visual interface 410 may interface with a touch enabled screen. The computer system 400 may also include input devices 412 (e.g., a keyboard a mouse), a cursor control device 414, a storage unit 416, a signal generation device 418 (e.g., a microphone and/or speaker), and a network interface device 420, which also are configured to communicate via the bus 408.

The storage unit 416 includes a machine-readable medium 422 (e.g., magnetic disk or solid-state memory) on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution.

Figure 5:
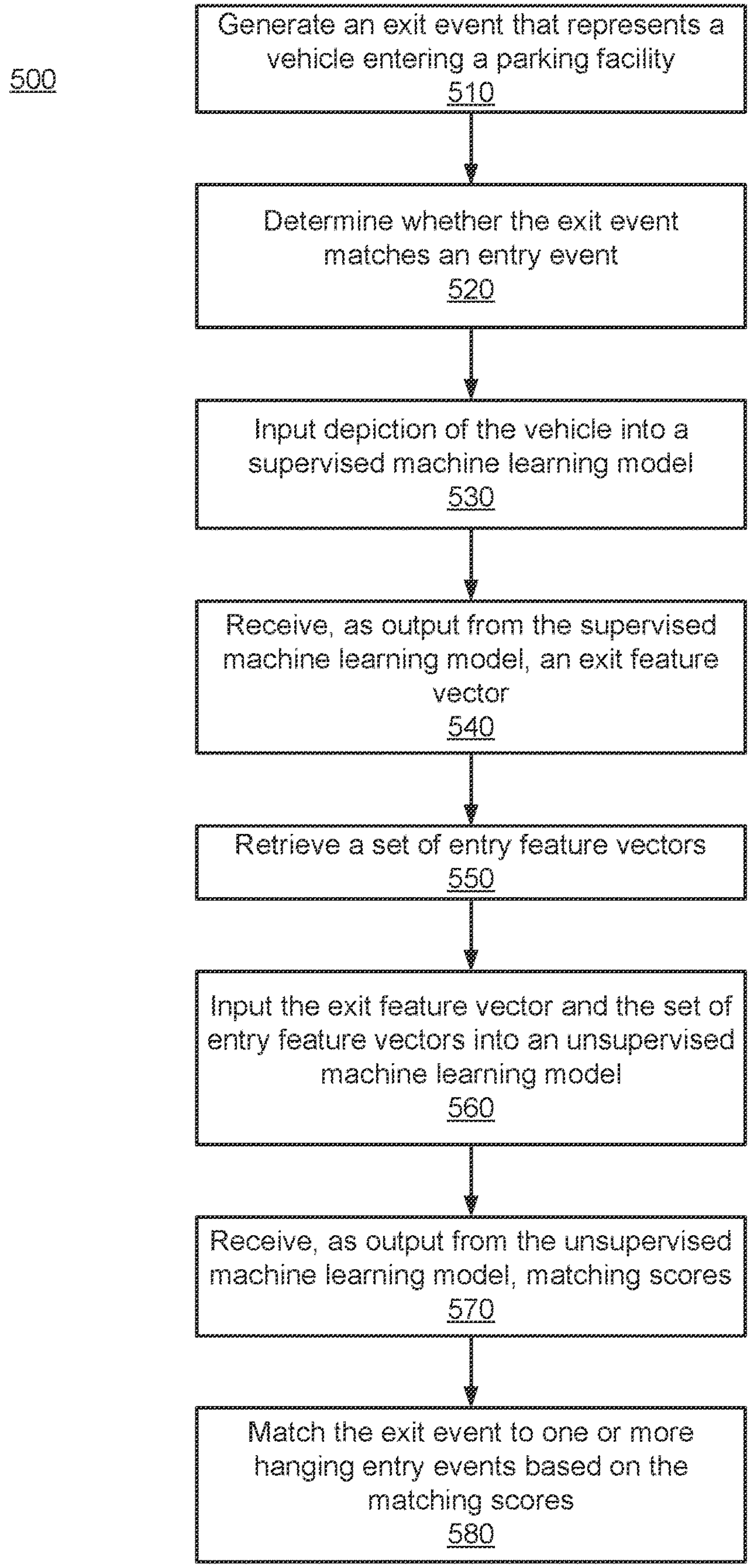
FIG. 5 depicts one embodiment of an exemplary process for matching an exit event to an entry event.

FIG. 5 depicts one embodiment of an exemplary process for matching an exit event to an entry event. Alternative embodiments may include more, fewer, or different steps from those illustrated in FIG. 5, and the steps may be performed in a different order from that illustrated in FIG. 5. Process 500 operates with one or more processors (e.g., processor 402 of edge device 110 and/or of parking control server 130) executing instructions (e.g., instructions 424) that cause one or more modules to perform their respective operations.

Process 500 begins with edge device 110 generating 510 an exit event that represents a vehicle exiting a parking facility (e.g., using exit detection module 214). Edge device 110 may detect the exit event using camera 112 to capture a series of images over time, determine a data set corresponding to the vehicle in the exit event, and store the exit event along with the data set corresponding to the vehicle, images featuring the vehicle, or other data.

Edge device 110 determines 520 whether the exit event matches an entry event that also represents the vehicle (e.g., using event matching module 218). To make the determination, the edge device compares the data set stored with the exit event to data sets stored with entry events. The edge device determines a match between the exit event and an entry event where heuristics are satisfied, for example where the vehicle identifiers in each dataset match or where combinations of characteristics match.

Responsive to determining 520 that the exit event does not match an entry event, edge device 110 inputs 530 a depiction of the vehicle into a supervised machine learning model and receives 540, as output from the supervised machine learning model, an exit feature vector (e.g., using exit detection module 214). The depiction of the vehicle may include the images that include the vehicle, for example as captured by camera 112. The exit feature vector may include embeddings derived from dimensions of the depiction of the vehicle.

Edge device 110 retrieves 550 a set of entry feature vectors. Edge device 110 may have previously calculated the entry feature vectors, for example on entry. Or, edge device 110 may calculate the entry feature vectors responsive to the determination 520. In some embodiments, the set of entry feature vectors includes a set of entry feature vectors associated with hanging entry events, where hanging entry events are entry events not matched with exit events.

Edge device 110 inputs 560 the exit feature and the set of entry feature vectors into an unsupervised machine learning model and receives 570, as output from the unsupervised machine learning model, a plurality of matching scores comprising a matching score for each entry feature vector in the set of entry feature vectors. Edge device 110 matches 580 the exit event to one or more of the hanging entry events based on the matching scores. Edge device 110 may automatically match the exit event to an entry event, for example automatically matching the exit event with the entry event that has the highest matching score. In some embodiments, edge device 110 may provide, for display, a subset of entry events for an administrator to manually select a match for the exit event. For example, edge device 110 may provide the entry events with the three highest match scores.

Figure 6:
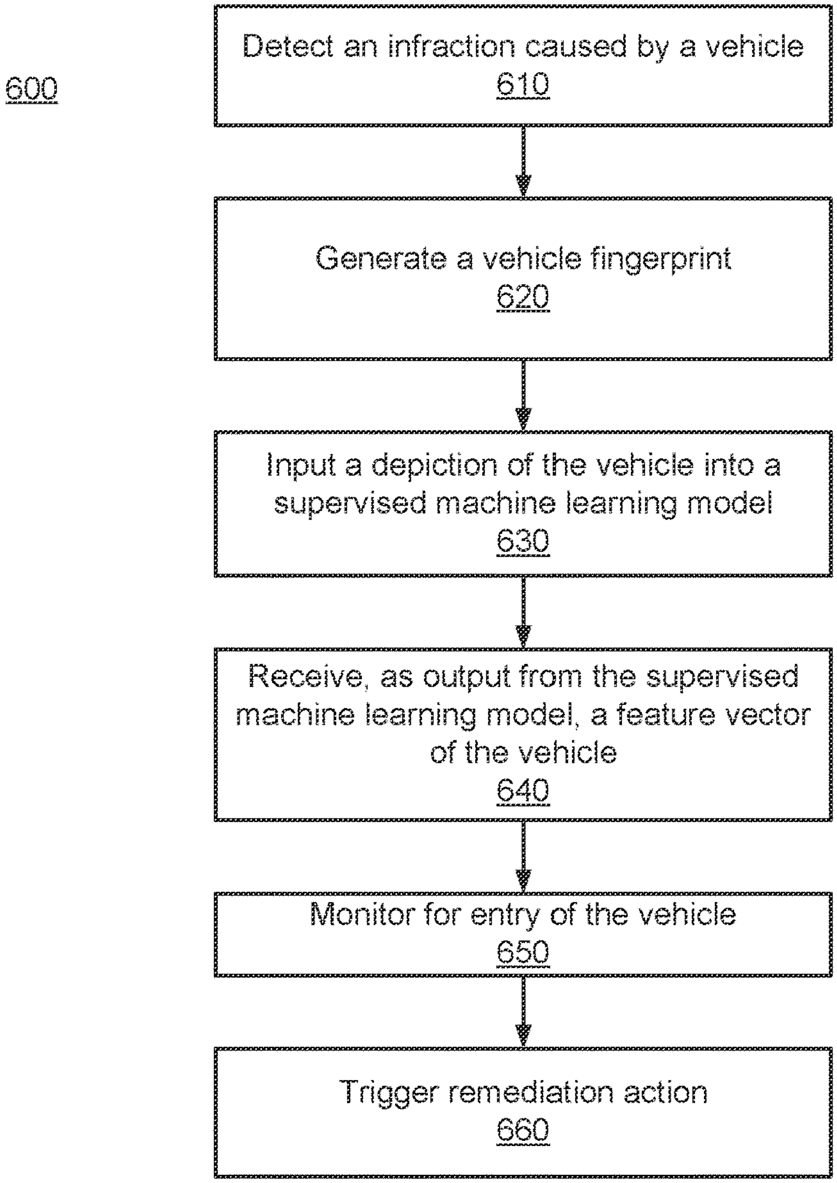
FIG. 6 depicts one embodiment of an exemplary process for detecting and responding to infractions caused by vehicles.

FIG. 6 depicts one embodiment of an exemplary process for detecting and responding to infractions caused by vehicles. Alternative embodiments may include more, fewer, or different steps from those illustrated in FIG. 6, and the steps may be performed in a different order from that illustrated in FIG. 6. Process 600 operates with one or more processors (e.g., processor 402 of edge device 110 and/or of parking control server 130) executing instructions (e.g., instructions 424) that cause one or more modules to perform their respective operations.

Process 600 begins with edge device 110 detecting 610 an infraction caused by a vehicle at a parking facility. Edge device 110 (e.g., using infraction detection module 222) may detect the infraction based on sensor data, such as data from camera 112, sensor 118 attached to gate 114, a parking sensor, or from any other type of sensor in the parking facility. Edge device 110 may detect the infraction using more than one sensor in combination.

Edge device 110 generates 620 a vehicle fingerprint corresponding to the vehicle that caused the infraction (e.g., using fingerprint generation module 224) by inputting 630 a depiction of the vehicle into a supervised machine learning model and receiving 640, as output from the supervised machine learning model, an infraction feature vector of the vehicle. The depiction of the vehicle may include images that include the vehicle, for example as captured by camera 112. The infraction feature vector may include embeddings derived from dimensions of the depiction of the vehicle.

Edge device 110 monitors 650 for entry of the vehicle at a parking facility of a plurality of parking facilities (e.g., using entry monitoring module 226). Edge device 110 may monitor for entry of the vehicle by comparing an entry feature vector of the vehicle (e.g., determined by entry detection module 212) to a set of infraction feature vectors.

Responsive to detecting entry of the vehicle at a given one of the parking facilities, edge device 110 triggers 660 a remediation action. Edge device 110 may trigger a remediation action based on the type of infraction.

Figure 7A:
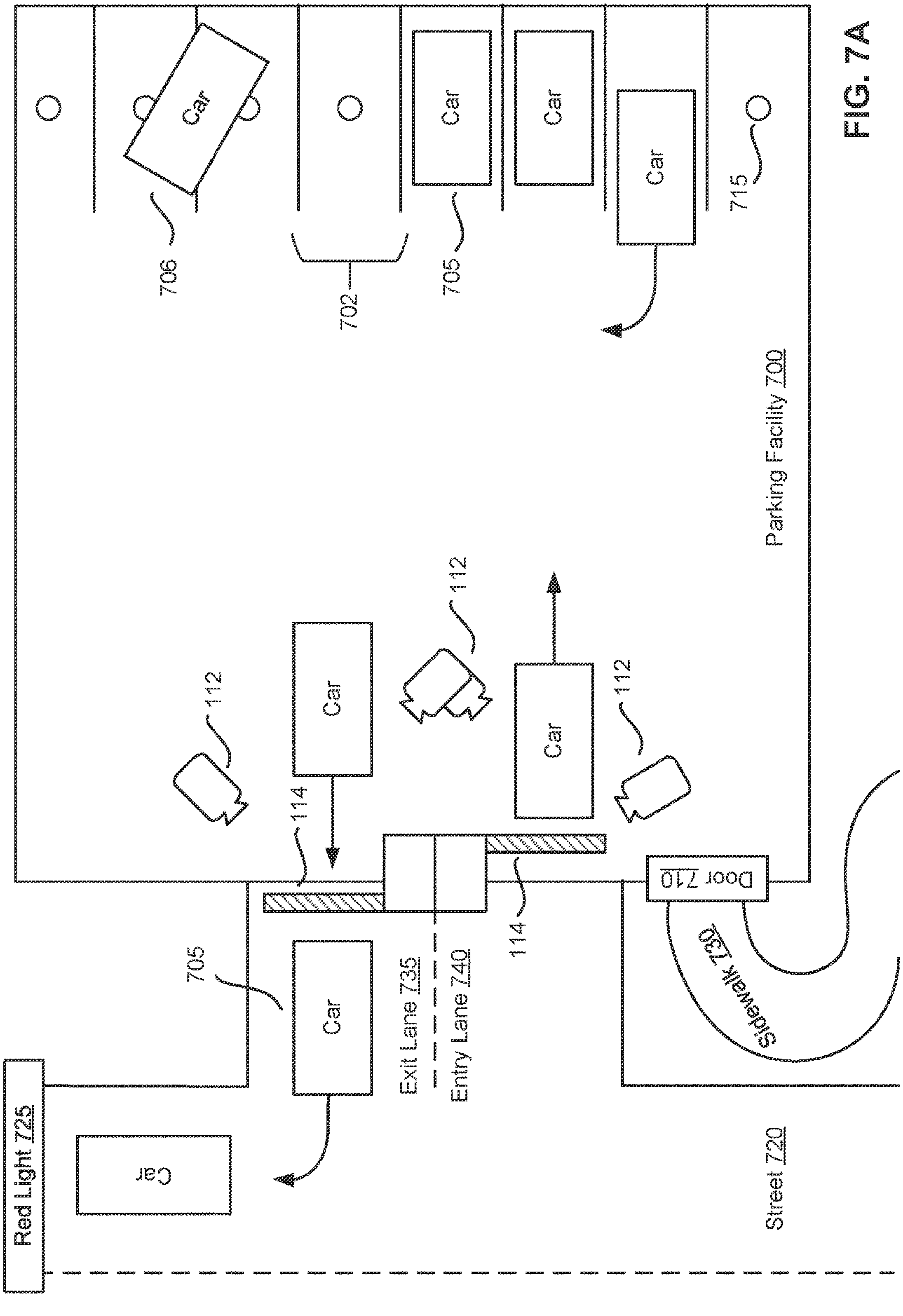
FIGS. 7A-C depict embodiments of an exemplary parking facility vicinity and moveable gate.
Figure 7B:
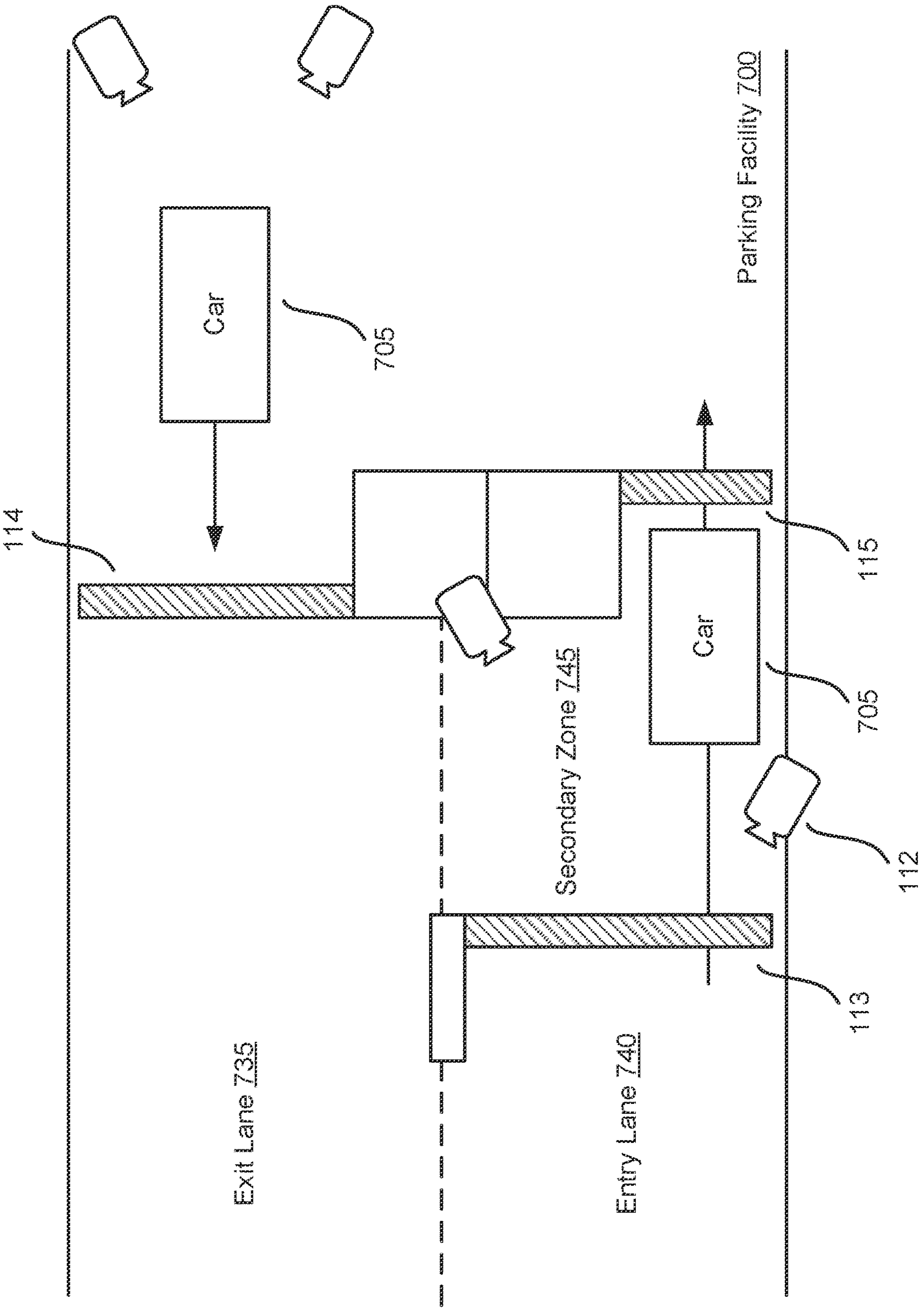
Figure 7C:
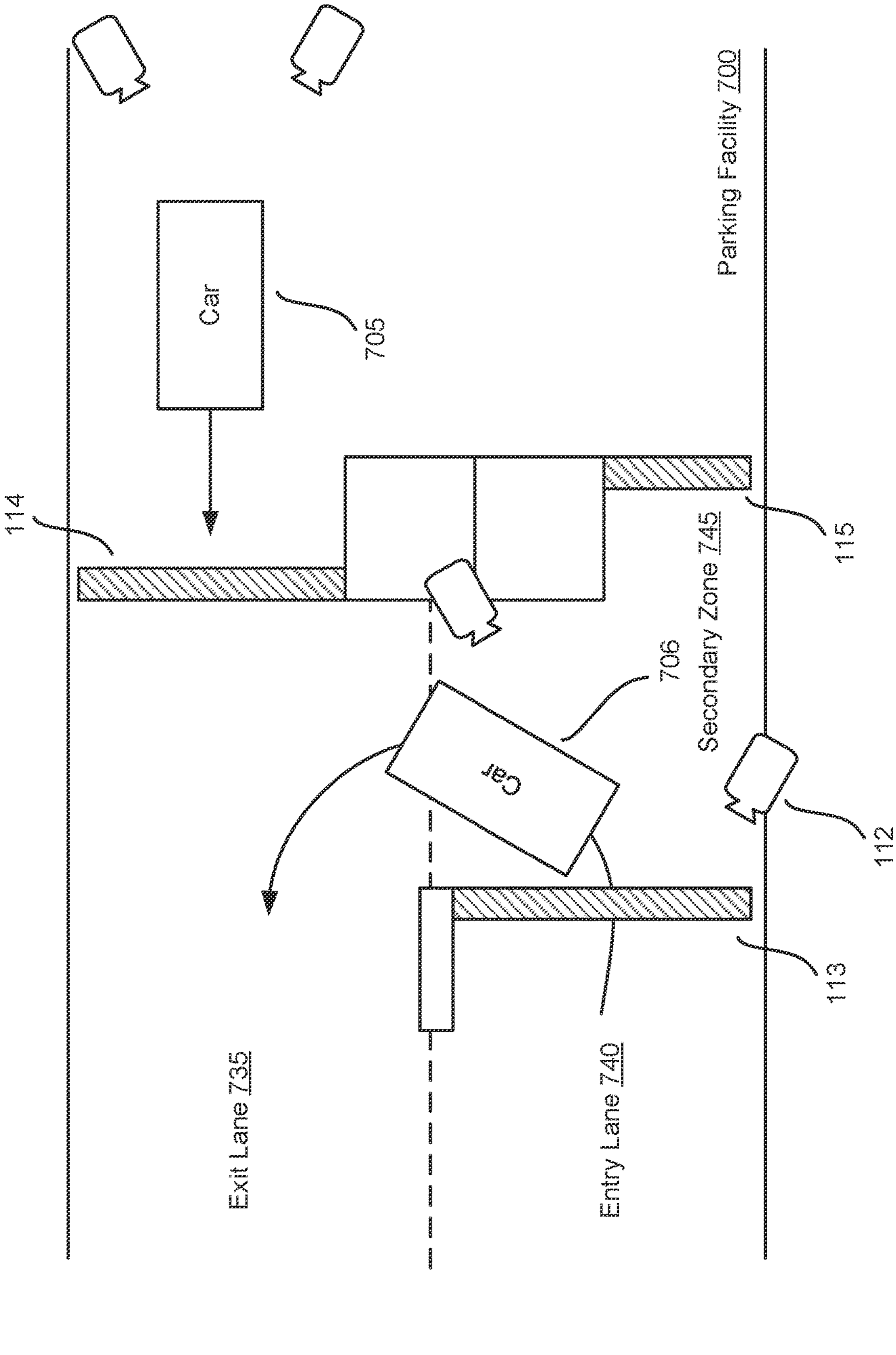

FIGS. 7A-C depict embodiments of an exemplary parking facility and moveable gate. As depicted in FIG. 7A, a parking facility 700 includes a set of parking spaces 702 within which vehicles 705 (e.g., cars) may park. Parking facility 700 includes sensors, such as parking sensors 715 and cameras 112. Parking sensors 715 may be located within parking spaces 702 to detect when vehicles 705 are present. As depicted on the left-hand side of parking facility 700, parking facility 700 includes gates 114. The bottom gate 114 allows vehicles 705 to enter parking facility 700 from street 720 through an entry lane 740 and the top gate 114 allows vehicles 705 to exit parking facility 700 through an exit lane 735.

Parking facility 700 may include a pedestrian door 710, allowing pedestrians to enter from, for example, a sidewalk 730. The pedestrian door may be locked and RFID enabled such that users may enter through the pedestrian door responsive to edge device 110 receiving, from the user, a set of user credentials. Example user credentials may include user personal information, contact information, account information, and vehicle information (e.g., make, model, color, license plate).

FIG. 7A also depicts an infracting vehicle 706. Edge device 110 may, through infraction detection module 222, determine that vehicle 706 is an infracting vehicle due to the way vehicle 706 is parked, where the vehicle is talking up two parking spots 702 instead of one parking spot 702. Responsive to detecting the infraction, edge device 110 may trigger a remediation action that allocates for the use of the multiple parking spaces. Responsive to detecting some infractions, edge device 110 may trigger remediation actions that deploy an exit blocking device (e.g., gate 114) that prevents movement of vehicle 705 (or 706) out from parking facility 700.

FIGS. 7B and 7C depict embodiments of parking facility 700 in which a two-gate system is implemented in entry lane 740. The two-gate system includes a first gate 113 with cameras 112 pointed towards it and a second gate 115. Between the first gate 113 and the second gate 115 is a secondary zone 745. The secondary zone 745 includes access to the exit lane 735 (e.g., via crossing the dashed line). FIG. 7B shows operation of the two-gate system responsive to a non-infracting vehicle (e.g., vehicle 705) attempting to enter the parking facility. In FIG. 7B, responsive to detecting vehicle 705 at the first gate 113, edge server 110 may open the first gate 113, allowing vehicle 705 to pass into a secondary zone 745. While in the secondary zone 745, cameras 112 may take images of vehicle 705. Responsive to determining (e.g., through entry monitoring module 226) that vehicle 705 is not an infracting vehicle, edge device 110 may open the second gate 115, allowing vehicle 705 to enter parking facility 700. FIG. 7C shows operation of the two-gate system responsive to an infracting vehicle (e.g., vehicle 706) attempting to enter the parking facility. In FIG. 7C, responsive to detecting infracting vehicle 706 at the first gate 113, edge server 110 may open the first gate 113, allowing infracting vehicle 706 to pass into a secondary zone 745. While in the secondary zone 745, cameras 112 may take images of infracting vehicle 706. Responsive to determining (e.g., through entry monitoring module 226) that vehicle 706 is an infracting vehicle, instead of opening the second gate 115 as edge device 110 did for vehicle 705, edge device 110 may trigger a remediation action. For example, as a remediation action, edge device 110 may provide, for display at the second gate 115, a message to a user of infracting vehicle 706 asking the user to route infracting vehicle 706 into exit lane 735.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Upon reading this disclosure, those of skill in the art will appreciate still additional alternative structural and functional designs for a system and a process for seamless entry and exit to a parking facility blocked by a moveable gate through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

detecting, using input from one or more sensors installed at a parking facility of a plurality of parking facilities, an indication of a possible infraction caused by a vehicle;

responsive to detecting the indication of the possible infraction, transmitting instructions to a moveable camera system, causing the moveable camera system to automatically navigate the movable camera system to a location of the infraction and capture an image of the vehicle;

confirming, based on the image of the vehicle captured by the moveable camera system after navigating to the location of the infraction, that an infraction has in fact occurred;

responsive to confirming that the infraction has in fact occurred, generating a vehicle fingerprint of the vehicle as a reference for additional sensors deployed in the plurality of parking facilities to automatically identify the vehicle in other locations by:

inputting a depiction of the vehicle into a supervised machine learning model, the depiction derived from one or more images of the vehicle captured at the parking facility; and receiving a feature vector of the vehicle as output from the supervised machine learning model, the feature vector comprising a plurality of embeddings each describing a dimension of the vehicle;

based on confirming that the infraction has in fact occurred, automatically monitoring, using the additional sensors, for entry of the vehicle at each of the plurality of parking facilities using the vehicle fingerprint; and responsive to detecting entry of the vehicle at a given one of the plurality of parking facilities, triggering a remediation action.

2. The method of claim 1, wherein the input comprises an indication that two or more adjacent parking spaces in the parking facility have transitioned from a vacant state to an occupied state within a threshold amount of time of one another.

3. The method of claim 2, wherein confirming that the infraction has in fact occurred comprises:

commanding the moveable camera system to navigate to a vantage point comprising the two or more adjacent parking spaces and capture one or more images of the two or more adjacent parking spaces;

determining whether the vehicle is occupying the two or more adjacent parking spaces; and confirming that the infraction has in fact occurred in response to determining that the vehicle is occupying the two or more adjacent parking spaces.

4. The method of claim 1, wherein generating the vehicle fingerprint is performed further responsive to detecting that a license plate of the vehicle is not recognized.

5. The method of claim 4, wherein monitoring for entry of the vehicle comprises monitoring for the license plate of the vehicle where the license plate of the vehicle is recognized.

6. The method of claim 1, wherein inputting the depiction of the vehicle into the supervised machine learning model comprises:

isolating, from the one or more images, a first image portion containing the vehicle; and excluding, from the one or more images, a second image portion that does not contain the vehicle.

7. The method of claim 1, wherein triggering the remediation action comprises:

determining an infraction type of the infraction; and transmitting a remediation command resulting in the remediation action based on the infraction type.

8. The method of claim 7, wherein the remediation command comprises a command to raise a blocking device preventing movement of the vehicle within the parking facility.

9. The method of claim 7, wherein the remediation command comprises a command to initiate a communication session with a law enforcement entity.

10. The method of claim 1, further comprising:

determining whether the vehicle is in a candidate set of known vehicles; and responsive to determining that the vehicle is not in the candidate set of known vehicles, generating a vehicle fingerprint corresponding to the vehicle.

11. A non-transitory computer-readable medium comprising memory with instructions encoded thereon, the instructions comprising instructions to:

detect, using input from one or more sensors installed at a parking facility of a plurality of parking facilities, an indication of a possible infraction caused by a vehicle;

responsive to detecting the indication of the possible infraction, transmitting instructions to a movable camera system, causing the moveable camera system to automatically navigate the moveable camera system to a location of the infraction and capture an image of the vehicle;

confirm, based on the image of the vehicle captured by the moveable camera system after navigating to the location of the infraction, that an infraction has in fact occurred;

responsive to confirming that the infraction has in fact occurred, generate a vehicle fingerprint of the vehicle as a reference for additional sensors deployed in the plurality of parking facilities to automatically identify the vehicle in other locations by:

inputting a depiction of the vehicle into a supervised machine learning model, the depiction derived from one or more images of the vehicle captured at the parking facility; and receiving a feature vector of the vehicle as output from the supervised machine learning model, the feature vector comprising a plurality of embeddings each describing a dimension of the vehicle;

based on confirming that the infraction has in fact occurred, automatically monitor, using the additional sensors, for entry of the vehicle at each of the plurality of parking facilities using the vehicle fingerprint; and responsive to detecting entry of the vehicle at a given one of the plurality of parking facilities, trigger a remediation action.

12. The non-transitory computer-readable medium of claim 11, wherein the input comprises an indication that two or more adjacent parking spaces in the parking facility have transitioned from a vacant state to an occupied state within a threshold amount of time of one another.

13. The non-transitory computer-readable medium of claim 12, wherein the instructions to confirm that the infraction has in fact occurred comprise instructions to:

command the moveable camera system to navigate to a vantage point comprising the two or more adjacent parking spaces and capture one or more images of the two or more adjacent parking spaces;

determine whether the vehicle is occupying the two or more adjacent parking spaces; and confirm that the infraction has in fact occurred in response to determining that the vehicle is occupying the two or more adjacent parking spaces.

14. The non-transitory computer-readable medium of claim 11, wherein generating the vehicle fingerprint is performed further responsive to detecting that a license plate of the vehicle is not recognized.

15. The non-transitory computer-readable medium of claim 14, wherein monitoring for entry of the vehicle comprises monitoring for the license plate of the vehicle where the license plate of the vehicle is recognized.

16. The non-transitory computer-readable medium of claim 11, wherein inputting the depiction of the vehicle into the supervised machine learning model comprises:

isolating, from the one or more images, a first image portion containing the vehicle; and excluding, from the one or more images, a second image portion that does not contain the vehicle.

17. The non-transitory computer-readable medium of claim 11, wherein the instructions to trigger the remediation action comprise instructions to:

determine an infraction type of the infraction; and transmit a remediation command resulting in the remediation action based on the infraction type.

18. The non-transitory computer-readable medium of claim 17, wherein the remediation command comprises a command to raise a blocking device preventing movement of the vehicle within the parking facility.

19. The non-transitory computer-readable medium of claim 17, wherein the remediation command comprises a command to initiate a communication session with a law enforcement entity.

20. A system comprising:

memory with instructions encoded thereon; and one or more processors that, when executing the instructions, are caused to perform operations comprising:

detecting, using input from one or more sensors installed at a parking facility of a plurality of parking facilities, an indication of a possible infraction caused by a vehicle;

responsive to detecting the indication of the possible infraction, transmitting instructions to a moveable camera system, causing the moveable camera system to automatically navigate the movable camera system to a location of the infraction and capture an image of the vehicle;

confirming, based on the image of the vehicle captured by the moveable camera system after navigating to the location of the infraction, that an infraction has in fact occurred;

responsive to confirming that the infraction has in fact occurred, generating a vehicle fingerprint of the vehicle as a reference for additional sensors deployed in the plurality of parking facilities to automatically identify the vehicle in other locations by:

inputting a depiction of the vehicle into a supervised machine learning model, the depiction derived from one or more images of the vehicle captured at the parking facility; and receiving a feature vector of the vehicle as output from the supervised machine learning model, the feature vector comprising a plurality of embeddings each describing a dimension of the vehicle;

based on confirming that the infraction has in fact occurred, automatically monitoring, using the additional sensors, for entry of the vehicle at each of the plurality of parking facilities using the vehicle fingerprint; and responsive to detecting entry of the vehicle at a given one of the plurality of parking facilities, triggering a remediation action.

* * * * *